United States Patent

Ni

Patent Number: 5,905,818
Date of Patent: May 18, 1999

[54] METHOD OF PROVIDING A REPRESENTATION OF AN OPTICAL SCENE BY THE WALSH-HADAMARD TRANSFORM, AND AN IMAGE SENSOR IMPLEMENTING THE METHOD

[75] Inventor: Yang Ni, Les Ulis, France

[73] Assignee: France Telecom, Paris, France

[21] Appl. No.: 08/818,945

[22] Filed: Mar. 17, 1997

[30] Foreign Application Priority Data

Mar. 15, 1996 [FR] France .................................. 96 03293

[51] Int. Cl.$^6$ ....................................... G06K 9/36
[52] U.S. Cl. ........................................... 382/281
[58] Field of Search .................. 382/276, 277, 382/281, 283; 364/727.01

[56] References Cited

U.S. PATENT DOCUMENTS

| | | |
|---|---|---|
| 3,775,602 | 11/1973 | Alexandridis et al. . |
| 3,925,646 | 12/1975 | Richardson et al. . |
| 4,011,441 | 3/1977 | Michon et al. . |
| 4,129,887 | 12/1978 | Michon . |
| 4,261,043 | 4/1981 | Robinson et al. .................. 364/727.01 |
| 4,335,373 | 6/1982 | Sloane ................................ 364/727.01 |
| 4,446,530 | 5/1984 | Tsuboka ............................. 364/727.01 |
| 4,460,969 | 7/1984 | Pi-Fuay et al. . |
| 4,590,608 | 5/1986 | Pi-Fuay et al. . |
| 4,809,194 | 2/1989 | Crookshanks ........................... 382/281 |
| 4,839,844 | 6/1989 | Watari ................................ 364/727.01 |
| 4,892,370 | 1/1990 | Lee .................................... 364/727.01 |
| 5,175,802 | 12/1992 | Crookshanks ........................... 382/281 |
| 5,262,871 | 11/1993 | Wilder et al. . |

OTHER PUBLICATIONS

Gonzalez et al. "Digtal image Processing" Addison–Wesley Publishign company, Inc. pp. 130–137, Sep. 1993.

Proceedings of the international symposium on circuits and systems, San Diego, May 10–13, 1992, vol. 1 of 6, May 10, 1992, Institute of Electrical and Electronics Engineers, pp. 137–140, XP000337262 Falkowski B J: "Generalized Walsh Transforms of Boolean Functions".

Primary Examiner—Jon Chang
Assistant Examiner—Jingge Wu
Attorney, Agent, or Firm—Marshall, O'Toole, Gerstein, Murray & Borun

[57] ABSTRACT

For providing a digital representation of an optical scene, radiometric values of N×N points representing a real two-dimensional optical scene are measured in the form of N×N respective electric signals $x(i,j)$. N×N masks $Mnm(i,j)$ respectively associated with the N×N electric signals $x(i,j)$ are generated. For each couple $(n,m)$, the N×N electric signals $x(i,j)$ are weighted by the corresponding N×N masks $Mnm(i,j)$ and the weighted electric signals are added to obtain N×N coefficients of the Walsh-Hadamard transform representing the optical scene.

9 Claims, 5 Drawing Sheets

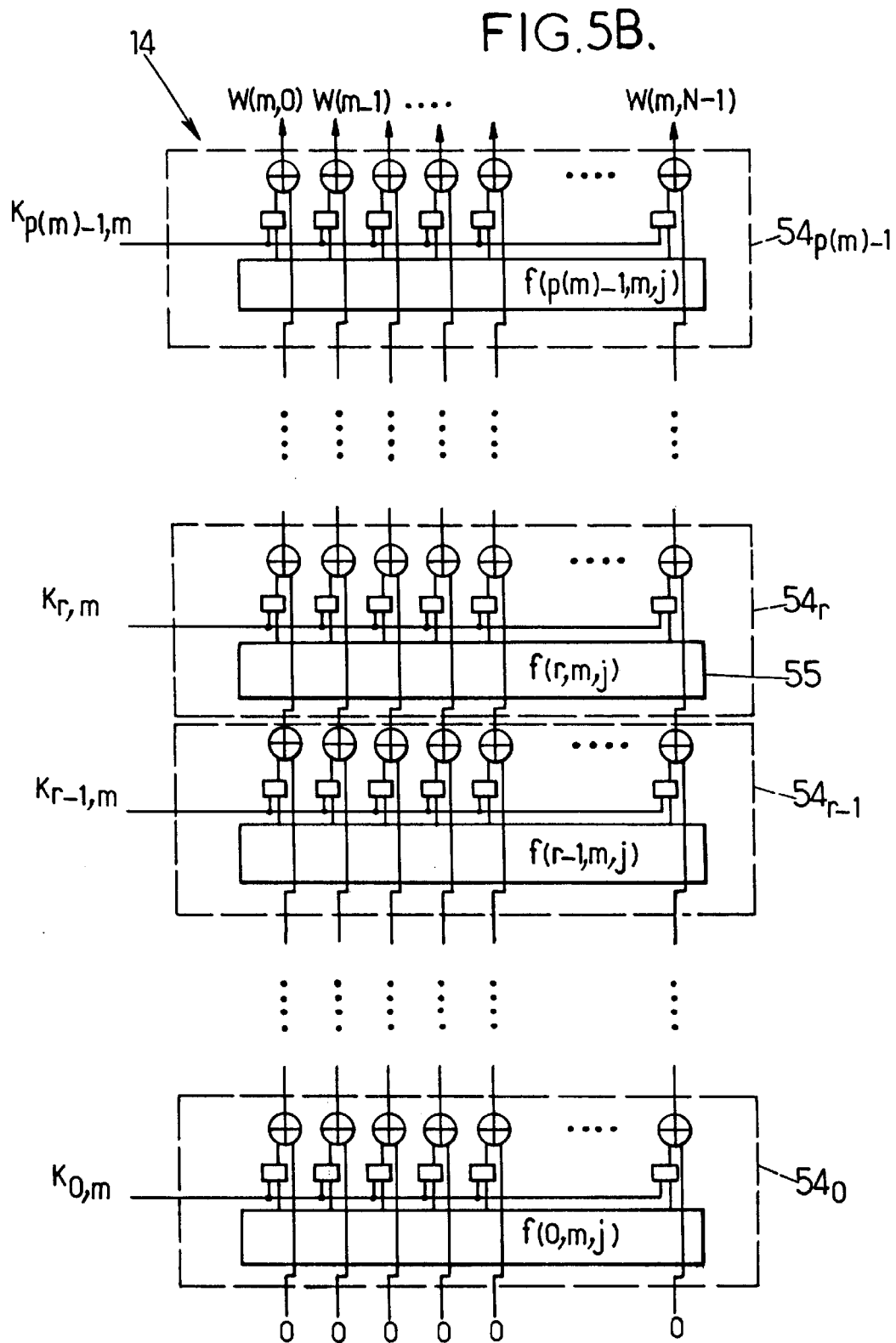

FIG.6.
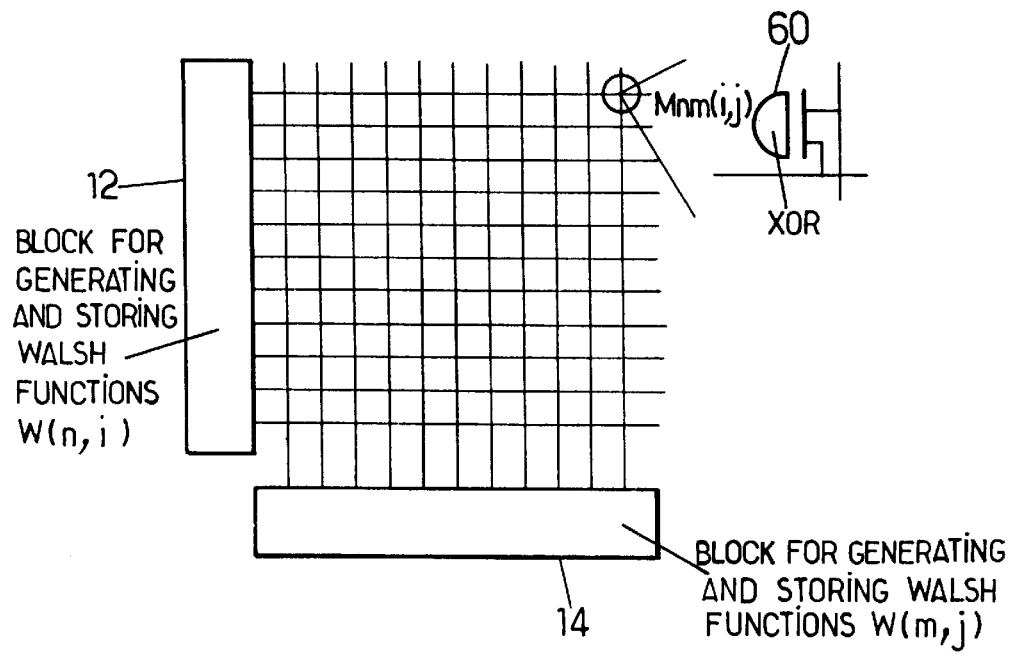
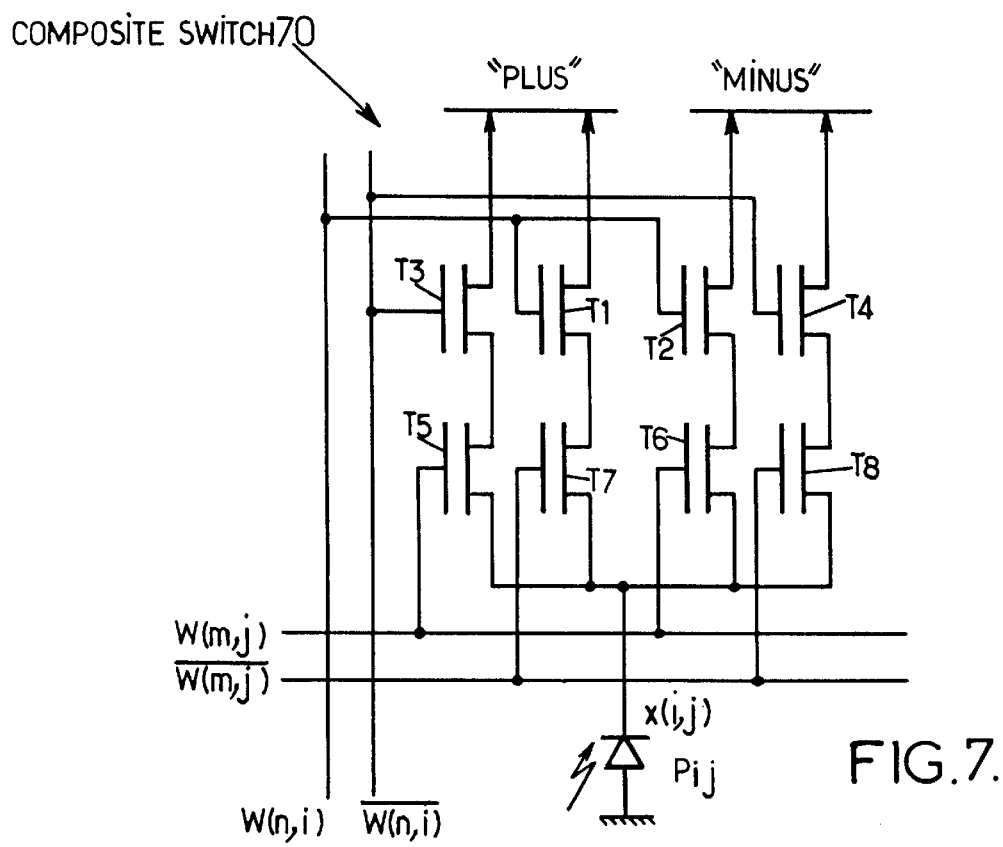
FIG.7.

METHOD OF PROVIDING A REPRESENTATION OF AN OPTICAL SCENE BY THE WALSH-HADAMARD TRANSFORM, AND AN IMAGE SENSOR IMPLEMENTING THE METHOD

BACKGROUND OF THE INVENTION

The present invention relates to a method of providing a representation of an optical scene by the Welsh-Hadamard transform, and to an image sensor implementing the method. Recently, computer networks and multimedia technology have been developing rapidly. Data compression has thus become an important topic. In particular, numerous encoding methods have appeared in the field of image compressions. Of the methods used, encoding sytems using orthogonal transforms make it possible, for given image quality, to obtain compression ratios that are better than those obtained by methods of the linear prediction type. In addition, orthogonal transform encoding systems are much less sensitive to errors, e.g. transmission errors, than are prediction systems.

Although very many transforms have been studied, only a few are actually used at present: the Karhunen-Loève transform which theoretically provides the best results, but which remains difficult to implement; the discrete cosine transform (DCT) which constitutes a good approximation to the Karhunen-Loève transform and is specified in certain standards, and which is easier to implement; and the Walsh-Hadamard transform which is well suited to digital computation.

Like the Fourier transform, the Walsh-Hadamard transform consists in resolving the signal in question into a set of base vectors that are orthogonal. The Walsh-Hadamard transform can also be applied to multi-dimensional signals. Unlike the Fourier transform, it resolves the signal in question into a set of vectors that are not sinusoidal.

SUMMARY OF THE INVENTION

An object of the present invention is to provide a method and an image sensor including a module that implements the Walsh-Hadamard transform so as to provide at its output, not gray level values associated with picture elements or "pixels" in the transformed image, but directly the values of the coefficients of the Walsh-Hadamard transform for an optical scene as sensed.

Conventional image sensors implement an encoding method in which: an optical scene is sensed in the form of an analog signal referred to as the "sensed image"; the sensed image is transformed into a digital image; the values of the gray levels of all of the digital picture elements are read and stored; a transform is applied to the image, which transform may be the Walsh-Hadamard transform; and the transformed image signal is subsampled in order to reconstitute the sensed image. The methods used include a very long succession of steps that are expensive in computation time. As a result, prior art image sensors have required the use of electronic components that are very fast and therefore expensive, in order to avoid a tradeoff between computation time and image resolution.

In order to remedy those drawbacks, the present invention proposes a method of providing a representation of an optical scene by the Walsh-Hadamard transformation, in which:

a) the radiometric (intensity) parameters of N×N points representing a real two-dimensional optical scene are measured in the form of N×N respective electric signals x(i,j), where N is a positive integer not less than 1, and i and j are integers in the range 0 to N-1, representing said two dimensions;

b) N×N weighting functions, known as "masks" are generated which are respectively associated with the N×N electric signals x(i,j), said functions taking the values +1 or -1 only, and being written Mnm(i,j), where n and m are integers lying in the range 0 to N-1, each mask being obtained from the equation:

$$Mnm(i,j) = W(n,i) \times W(m,j)$$

where W(a,b) designates the discrete one-dimensional Walsh function of order a on N points, given by the equation:

$$W(a,b) = \prod_{r=0}^{p(a)-1} f(r,a,b)$$

where $f(r,a,b) = \mathrm{sgn}[\cos(K_{r,a} \cdot 2^r \cdot \pi \cdot (b/N))]$,
where r is an integer,
where b is an integer in the range 0 to N-1, and
where a is an integer such that:

$$a = \sum_{r=0}^{p(a)-1} K_{r,a} \cdot 2^r \quad \text{with} \quad K_{r,a} \in \{0,1\}$$

where p(a) is the number of binary digits needed to write the integer a in base 2,
where Π is the "product" symbol, and
sgn is the function defined by sgn(x)=+1 if x≧0, and sgn(x)=-1 if x<0;

c) for each couple (n,m), said N×N electric signals x(i,j) are weighted directly by said corresponding N×N masks Mnm(i,j) and the weighted electric signals are added to obtain N×N coefficients of the Walsh-Hadamard transform X(n,m), each given by the equation:

$$X(n,m) = \sum_{i=0}^{N-1} \sum_{j=0}^{N-1} x(i,j) \cdot Mnm(i,j)$$

and representing the optical scene as sensed.

The present invention also provides an image sensor implementing the above encoding method, the sensor comprising:

N×N photodetector means organized in the form of a matrix having N rows and N columns, to transform a light signal L(i,j), 0≦i≦N-1, 0≦j≦N-1, received from the optical scene in the i-th row and the j-th column into an electric current signal x(i,j);

p(n) first Walsh function generators, numbered by rank r, 0≦r≦p(n)-1, each comprising:

calculation means receiving the bit $K_{r,n}$ as an input, and calculating the value of f(r,n,i) for all i, 0 ≦i≦N-1, and providing an output "0" bit if f(r,n,i)=+1 or an output "1" bit if f(r,n,i)=-1; and N parallel-connected exclusive-OR operators, a first input of each of the N operators of rank r≧0 being connected to the output of said calculation means, and a second input of each of the N operators of rank r≧1 being connected to the respective corresponding output of the N exclusive-OR operators of rank r-1, the second input of each of the N operators of rank r=0 being fed with an initialization "0" logic level;

the N exclusive-OR operators of rank r=p(n)-1 delivering as outputs the N bits encoding the N Walsh functions W(n,i) for all i, $0 \leq i \leq N-1$, i.e. of value 0 if W(n,i)=+1, or 1 if W(n,i)=-1;

first memory means, having N inputs respectively connected to the N outputs of the first generator means of rank p(n)-1 for storing the values of W(n,i) for all i, $0 \leq i \leq N-1$;

p(m) second Walsh function generators, numbered by rank r, $0 \leq r \leq p(m)-1$, each comprising:

calculation means receiving the bit $K_{r,m}$ as an input, and calculating the value of f(r,m,j) for all j, $0 \leq j \leq N-1$, and providing an output "0" bit if f(r,m,j)=+1 or an output "1" bit if f(r,m,j)=-1; and N parallel-connected exclusive-OR operators, a first input of each of the N operators of rank $r \geq 0$ being connected to the output of said calculation means, and a second input of each of the N operators of rank $r \geq 1$ being connected to the respective corresponding output of the N exclusive-OR operators of rank r-1, the second input of each of the N operators of rank r=0 being fed with an initialization "0" logic level;

the N exclusive-OR operators of rank r=p(m)-1 delivering as outputs the N bits encoding the N Walsh functions W(m,j) for all j, $0 \leq j \leq N-1$, i.e. of value 0 if W(m,j)=+1, or 1 if W(m,j)=-1;

second memory means, having N inputs respectively connected to the N outputs of the second generator means of rank p(m)-1 for storing the values of W(m,j) for all j, $0 \leq j \leq N-1$; and N×N solid state elements respectively connected to one of the N outputs of the first memory means and one of the N outputs of the second memory means, which N×N solid state elements calculate the respective values of the binary variables encoding the N×N Walsh-Hadamard masks Mnm(i,j), giving the corresponding current x(i,j) a positive or a negative conventional sign depending on the logic level of the binary varible encoding Mnm(i,j), summing the currents obtained in this way in application of Kirchhoff's laws to provide N×N output coefficients of the Walsh-Hadamard transform X(n,m), $0 \leq n \leq N-1$, $0 \leq m \leq N-1$ of the sensed optical scene.

The above characteristics and others appear more clearly on reading the following description of a particular embodiment of the invention given by way of non-limiting example, and also of a modification. The description refers to the accompanying drawings.

BRIEF DESCRIPTION OF THE DRAWINGS

FIGS. 5A and 5B are block diagrams representing an array of electronic components in cascade in a particular embodiment of the invention for generating discrete one-dimensional Walsh functions;

FIG. 6 is a diagram including an enlarged detail showing a particular embodiment of an electronic circuit for generating a two-dimensional Walsh-Hadamard mask from two discrete one-dimensional Walsh functions; and FIG. 7 is an electronic circuit diagram showing a composite switch constituted by an array of NMOS transistors which simultaneously produce a Walsh-Hadamard mask and a contribution to the weighted sum of the set of masks.

DETAILED DESCRIPTION

Figure 1:
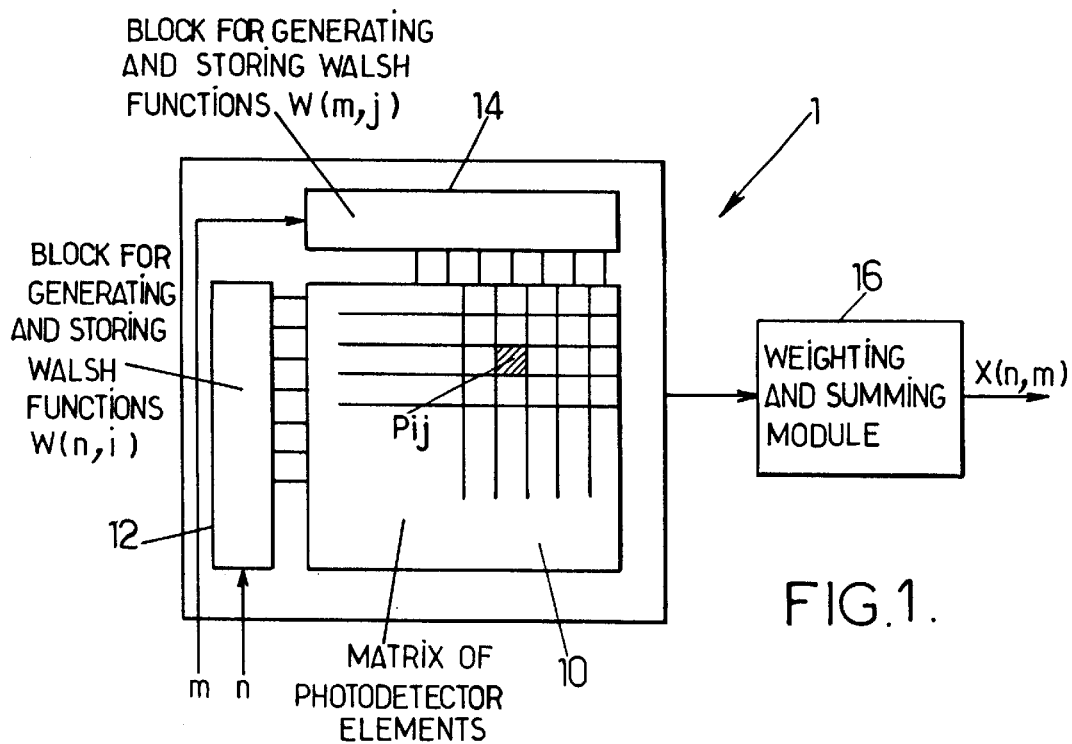
FIG. 1 is a diagram showing the overall structure of an image ssnsor of the present invention.

The overall structure of an image sensor in one embodiment of the present invention is shown diagrammatically in FIG. 1.

The sensor 1 comprises a matrix 10 of photodetector elements designed to receive light coming from an optical scene to be sensed, and for transforming the received light into electrical signals. FIG. 1 shows only a portion of the photodetector elements. The photodetector elements may be constituted in particular by photodiodes or by phototransistors.

The matrix 10 may have as many rows of photodetector elements as it has columns. For example, photodetector element Pij is situated in the i-th row and the j-th column of a matrix having N rows and N columns, where N is a positive integer not less than 1 and where i and j are integers lying in the range 0 to N-1, receives light flux L(i,j), and transforms it into an electric current signal written x(i,j).

The rows of photodetector elements in the matrix 10 are connected to the inputs of a block 12 for generating and storing Walsh functions W(n,i) where n is an integer lying in the range 0 to N-1. The detailed structure of the block 12 is described below.

In similar manner, the columns of photodetector elements in the matrix 10 are connected to the inputs of a block 14 for generating and storing Walsh functions W(m,j) where m is an integer lying in the range 0 to N-1. The detailed structure of the block 14 is also described below.

The output from a module comprising the matrix 10 of photodetector elements and the blocks 12 and 14 for generating and storing Walsh functions is connected to the input of a module 16 for weighting the electric signals x(i,j) by functions calculated from the set of Walsh functions W(n,i) and W(m,j), and for summing the weighted signals.

The weighting and summing module 16 is described in greater detail below. At its output it delivers N×N coefficients of the Walsh-Hadamard transform X(n,m) which represent the optical scene as sensed. The definition of these coefficients and the method of obtaining them are described below.

The optical scene to be sensed may be arbitrary. In a first step, radiometric (intensity) parameters coming from the optical scene are measured in the form of N×N electric signals x(i,j).

In an embodiment in which the optical scene is acquired by means of a matrix 10 of N×N photodiodes, the electric signal x(i,j) is the reverse current Id(i,j) passing through the photodiode Pij situated in the i-th row and the j-th column, and is given by Id(i,j)=K(i,j)×φ(i,j)+In(i,j), where K(i,j) designates the photoelectric conversion coefficient of the photodiode Pij, φ(i,j) designates the optical flux coming from the optical scene and sensed by the photodiode Pij, and In(i,j) represents an intrinsic leakage current in the photodiode Pij, known as dark current.

In another embodiment, where the optical scene is acquired by means of a matrix 10 of N×N phototransistors, the electric signal x(i,j) is the collector current, where K(i,j) designates the photoelectric conversion coefficient of the phototransistor Pij, φ(i,j) designates the optical flux from the optical scene as sensed by the phototransistor Pij, and In(i,j) represents intrinsic leakage current in the phototransistor.

Figure 2:
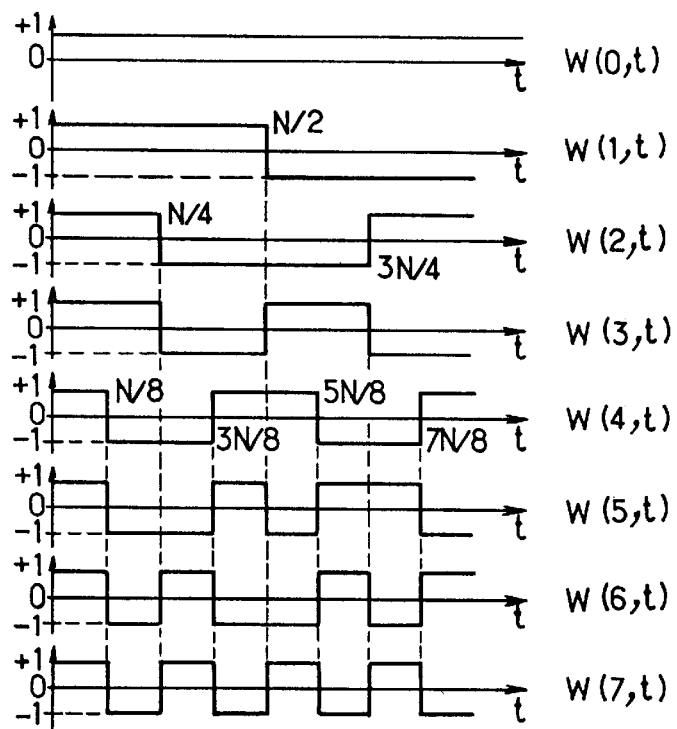
FIG. 2 is a set of curves showing the first eight Walsh-Hadamard functions.

In a second step, a weighting function Mnm(i,j) referred to as a Walsh-Hadamard mask is generated for each signal x(i,j). n and m are integers lying in the range 0 to N−1. Each mask has a value either of +1 or of −1. To obtain the mask Mnm(i,j), initially a discrete one-dimensional Walsh function W(n,i) of order n over N points is generated. This function is generated from the following equation:

$$W(n, i) = \prod_{r=0}^{p(n)-1} f(r, n, i)$$

where $f(r,n,i) = \text{sgn}[\cos(K_{r,n} \cdot 2^r \cdot \pi \cdot (i/N))]$,
where r is an integer, where n is an integer such that $$n = \sum_{r=0}^{p(n)-1} K_{r \cdot n} \cdot 2^r \quad \text{with} \quad K_{r \cdot n} \in \{0, 1\}$$

where p(n) is the number of binary digits needed to write the integer n in base 2, where Π is the "product" symbol, and where sgn is the function defined by sgn(x)=+1 if x≧0 and sgn(x)=−1 if x<0. By way of non-limiting example, FIG. 2 shows the eight first one-dimensional analog Walsh functions over N points, as a function of time t, i.e. W(0,t), W(1,t), . . . , W(7,t).

Still during the second step, a discrete one-dimensional Walsh function W(m,j) of order m over N points is also generated. This function is generated in analogous manner to the above, using the equation:

$$W(m, j) = \prod_{r=0}^{p(m)-1} f(r, m, j)$$

where $f(r,m,j) = \text{sgn}[\cos(K_{r,m} \cdot 2^r \cdot \pi \cdot (j/N))]$,
where m is an integer such that $$m = \sum_{r=0}^{p(m)-1} K_{r \cdot m} \cdot 2^r \quad \text{with} \quad K_{r \cdot m} \in \{0, 1\}$$

where p(m) is the number of binary digits needed to write the integer m in base 2.

Each mask Mnm(i,j) is then obtained by using the following equation:

$$Mnm(i,j) = W(n,i) \times W(m,j)$$

Figure 3:
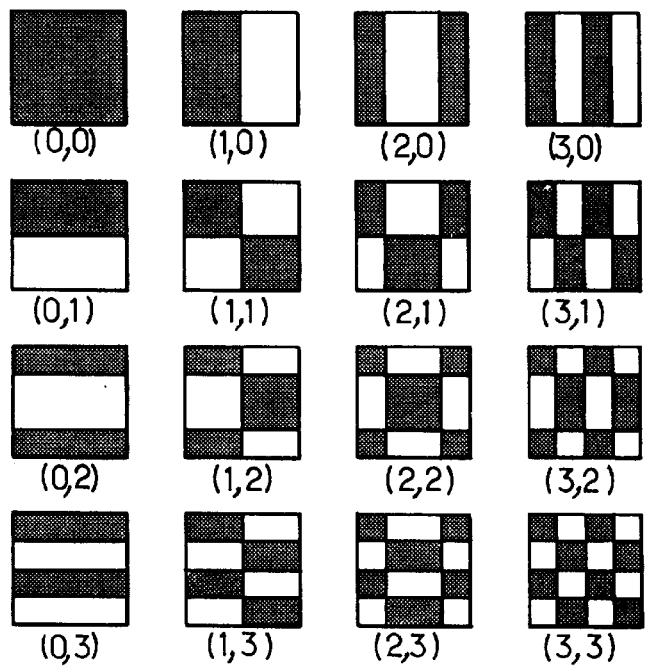
FIG. 3 shows the sixteen Walsh-Hadamard weighting masks associated with a transform on a 4×4 pixel square image.

In terms of representing black and white images, if the value +1 of a mask is associated with "black" (highest gray level) and the value −1 of a mask with "white" (lowest gray level), then each mask can be represented by a checkerboard pattern made up of black portions and white portions. By way of example, FIG. 3 shows the sixteen weighting masks of a checkerboard for N=4. The corresponding couple (n,m) is written beneath each mask.

In one implementation of the invention, during a third step of the method, for each couple (n,m), the N×N electric signals x(i,j) are weighted directly by the corresponding N×N masks Mnm(i,j) and the electric signals weighted in this way are added to obtain N×N coefficients of the Walsh-Hadamard transform X(n,m), each given by the following equation:

$$X(n, m) = \sum_{i=0}^{N-1} \sum_{j=0}^{N-1} x(i, j) \cdot Mnm(i, j)$$

and representing the optical scene as sensed.

The second and third steps of the method are described below in greater detail in the context of a particular implementation. It is clear from the equations giving the decimal magnitudes sgn, f, W, and Mnm, that all of these magnitudes take the following values only: +1 or −1. In the particular implementation described below, all of these magnitudes are encoded by binary variables having logic level "0" if the corresponding value in base ten (decimal system) is +1, and logic level "1" if the corresponding value in base ten is −1. Consequently, multiplying together two of these encoded decimal values is equivalent to an exclusive-OR logic operation.

During the above-described second step, the following steps are performed for each couple (i,j) where 0≦i≦N−1 and 0≦j≦N−1.

To obtain the value of the binary variable encoding the decimal value W(n,i), an iteration is performed in which, in succession:

the binary variable encoding W(n,i) is initialized to logic level "0";

the above-defined integer r is initialized to the value 0; and for each value of r, an exclusive-OR operation is performed between the current binary variable encoding W(n,i) and the binary variable encoding the decimal value f(r,n,i) au previously obtained from the equation given above, the binary variable encoding W(n,i) is updated to the logic level obtained after the exclusive-OR operation, and then r is incremented by 1;

the iteration stops when the integer r reaches the above-defined value p(n). This gives the value of the binary variable encoding W(n,i).

To obtain the value of the binary variable encoding W(m,j), a similar iteration is performed, i.e. the following in succession:

the binary variable encoding W(m,j) is initialized to logic level "0";

the integer r is initialized to 0; and for each value of r an exclusive-OR operation is performed between the current binary variable encoding W(m, j) and the binary variable encoding the decimal value f(r,m,j) as previously obtained from the equation given above, the binary variable encoding W(m,j) is updated to the logic level obtained after the exclusive-OR operation, and then r is incremented by 1;

the iteration stops when the integer r reaches the value p(m) as defined above. This gives the value of the binary variable encoding W(m,j).

To obtain the value of the binary variable encoding Mnm(i,j), an exclusive-OR operation is performed between the binary variables respectively encoding W(n,i) and W(m, j).

During the above-described third step, and in a particular implementation, the electric signals x(i,j) are weighted by the masks Mnm(i,j), and the weighted electric signals are summed, determining an overall positive component C+ and an overall negative component C− of the current, the overall positive component C+ being the strictly positive sum in application of Kirchhoff's laws of all of the currents x(i,j) having as their weighting functions respective masks Mnm (i,j) of value +1, and the overall negative component C− being the strictly positive sum in application of Kirchhoff's laws of all of the currents x(i,j) having as respective weighting functions masks Mnm(i,j) of value −1.

To this end, for each couple (n,m), where 0≦n≦N−1, 0≦m≦N−1:

the integers i, 0≦i≦N−1 are grouped together into two sets I+ and I−, and the integers j, 0≦j≦N−1 are grouped together into two sets J+ and J−, such that:

∀i∈I+, ∀j∈J+, Mnm(i,j)=+1 and
∀i∈I−, ∀j∈J−, Mnm(i,j)=−1;

in application of Kirchhoff's laws, firstly the currents x(i,j) for which i and j are included respectively in the sets I+ and J+ are added together and secondly the currents x(i,j) for which i and j are respectively included in the sets I− and J− are added together, thereby obtaining the overall positive component of the current $$C+ = \sum_{i \in I+, j \in J+} x(i,j)$$

and the overall negative component of the current $$C- = \sum_{i \in I-, j \in J-} x(i,j)$$

the current C− is subtracted from the current C+, thereby providing the coefficient of the Walsh-Hadamard transform X(n,m)=C+−C−.

Figure 4:
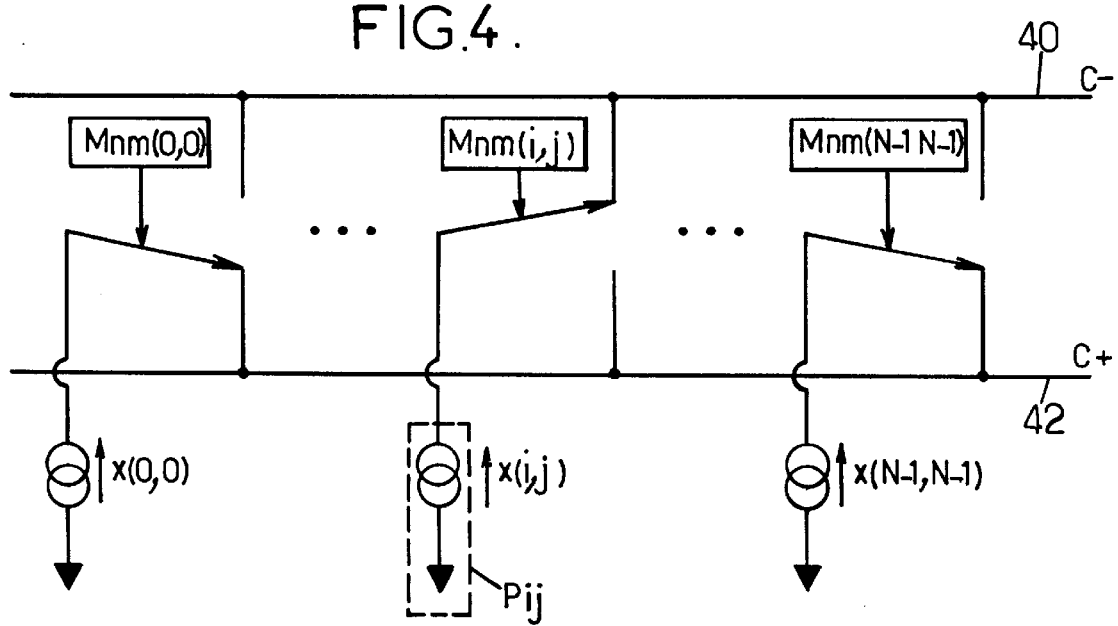
FIG. 4 is a circuit diagram symbolically representing a step in calculating the coefficients of the Walsh-Hadamard transform by summing currents, in a particular embodiment.

FIG. 4 is an electrical circuit diagram illustrating the above-described step for an arbitrary couple (n,m), i.e. the currents coming from the photodetector elements Pij are separated into two overall components, a positive component C+ and a negative component C−.

For each couple (i,j), 0≦i≦N−1, 0≦j≦N−1, the corresponding mask Mnm(i,j) controls switching of the current x(i,j), either to a line 40 for contributing to the negative overall component C−, or to a line 42 for contributing to the positive overall component C+. The current x(i,j) comes from photodetector element Pij that is represented diagrammatically as a current generator generating the current x(i,j) and connected to ground.

The switch positions chosen for FIG. 4 are arbitrary.

All of the currents switched to the line 40 are added together to obtain the component C−, and all of the currents switched to the line 42 are added together to obtain the component C+. The subsequent step of subtracting C+−C−, not shown in FIG. 4, can be performed inside or outside the image sensor implementing the method described herein, e.g. by means of a simple operational amplifier.

The image sensor described above in overall manner with reference to FIG. 1 implements the above method. The blocks 12 and 14 and the module 16 of the sensor are described below in greater detail, in a particular embodiment.

Figure 5A:
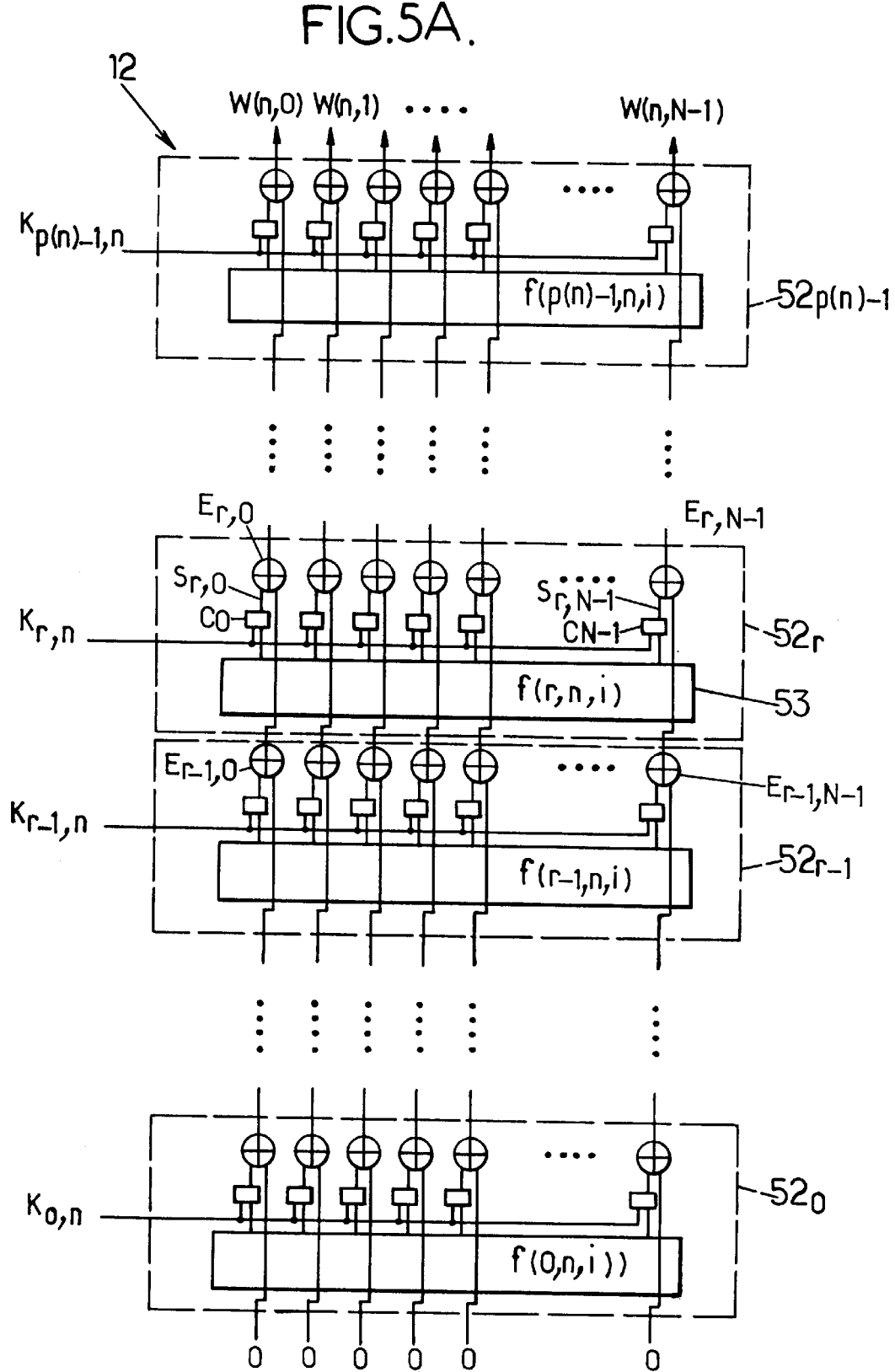

FIG. 5A is a diagram of the block 12 for generating and storing the N binary values respectively encoding the N discrete one-dimensional Walsh functions of order n, i.e. W(n,i) for all i lying in the range 0 to N−1.

As shown in FIG. 5A, the block 12 comprises p(n) Walsh function generator modules, of identical structure and referenced $52_0, \ldots, 52_{r-1}, 52_r, \ldots, 52_{p(n)-1}$, disposed in cascade and each having N parallel inputs and N parallel outputs. Since the p(n) modules are identical in structure, only arbitrarily selected module $52_r$ is described in detail.

It comprises a calculation unit 53 having N parallel inputs, each receiving corresponding above-defined bits $K_{r,n}$, it calculates the binary value encoding f(r,n,i) for all i lying in the range 0 to N−1 from the equation given above, i.e. it produces "0" if f(r,n,i)=+1 and it produces "1" if f(r,n,i)=−1, and it delivers the N result bits on its N parallel outputs $S_{r,0}, \ldots, S_{r,N-1}$. The elements $C_0, \ldots, C_{N-1}$ of the unit 53 shown in FIG. 5A represent the arithmetic and logic portion of the unit 53 performing the operation sgn[cos($K_{r,n} \cdot 2^r \cdot \pi \cdot$(i/N))] which, as described above, provides the value of f(r,n,i).

The module $52_r$ also comprises N exclusive-OR operators $E_{r,0}, \ldots, E_{r,N-1}$. The first input of each of said operators is connected to a respective output $S_{r,0}, \ldots, S_{r,N-1}$ of the calculation unit 53. The second input of each exclusive-OR operator $E_{r,0}, \ldots, E_{r,N-1}$ is connected to a respective output of the N exclusive-OR operators $E_{r-1,0}, \ldots, E_{r-1,N-1}$ of the module $52_{r-1}$, except for the module $52_0$ at the base of the cascade in which case the second input of each exclusive-OR operator is fed with the initialization "0" logic level.

In the module $52_{p(n)-1}$, at the top of the cascade, the outputs of the N exclusive-OR operators deliver the N bits respectively encoding the N Walsh functions W(n,i), 0≦i≦N−1, i.e. they provide the bit 0 if W(n,i)=+1 or the bit 1 if W(n,i)=−1. The outputs of the N exclusive-OR operators of the module $52_{p(n)-1}$ are respectively connected to the N inputs of a first suitable conventional digital memory (not shown), e.g. a RAM, which stores the N bits respectively encoding W(n,0), . . . , W(n,N−1).

FIG. 5B is analogous to FIG. 5A. It is therefore described only briefly. It shows diagrammatically the block 14 for generating and storing the N binary values respectively encoding the N discrete one-dimensional Walsh functions of order m, i.e. W(m,j) for all j in the range 0 to N−1.

The block 14 comprises p(m) Walsh function generator modules of identical structure referenced $54_0, \ldots, 54_{r-1}, 54_r, \ldots, 54_{p(m)-1}$, disposed in cascade and connected to one another in the same manner as the modules $52_0, \ldots, 52_{r-1}, 52_r, \ldots, 52_{p(n)-1}$, in FIG. 5A, and having the same structure as those modules. Like the above-described module $52_r$, the module $54_r$ has calculation unit 55 receiving input bits $K_{r,m}$ as defined above and calculating the binary value encoding f(r,m,j) for all j lying in the range 0 to N−1.

Like the module $52_0$, the second input of each exclusive-OR operator in the module $54_0$ is fed with an initialization "0" logic level.

Like the module $52_{p(n)-1}$, the outputs of the N exclusive-OR operators of the module $54_{p(m)-1}$ deliver to the N inputs of a second appropriate conventional digital memory (not shown), e.g. a RAM, the N bits respectively encoding W(m,0), . . . , W(m,N−1).

FIG. 6 shows a portion of the overall structure of the image sensor of the invention as already shown in FIG. 1, and in particular it shows the block 12 for generating and storing Walsh functions W(n,i) and the block 14 for generating and storing Walsh functions W(m,j). FIG. 6 also shows, on a larger scale, and for a particular embodiment, the circuit diagram of an electronic circuit that generates a two-dimensional Walsh-Hadamard mask Mnm(i,j) from two discrete one-dimensional Walsh functions, i.e. W(n,i) and W(m,j).

This electronic circuit is located at the cross-point between an output line from the block 12 and an output line from the block 14. N×N identical electronic circuits are thus disposed at the N×N cross-points between the N output lines of the block 12 and the N output lines of the block 14. In a particular embodiment, the electronic circuit comprises an exclusive-OR operator 60 having a first input connected to the output line of block 12 reaching at the cross-point in question, and having its other input connected to the output line of the block 14 reaching at the same cross-point. The operator 60 thus performs an exclusive-OR operation between the binary value encoding W(n,i) and the binary value encoding W(m,j), for a particular couple (i,j) and it outputs the binary value encoding the mask Mnm(i,j). As described above with reference to FIG. 4, the mask Mnm(i,j) then controls how the current x(i,j) is switched so as to deliver a contribution to the weighted sum $$X(n, m) = \sum_{i=0}^{N-1}\sum_{j=0}^{N-1} x(i, j) \cdot Mnm(i, j)$$

a coefficient of the Walsh-Hadamard transform.

The electronic circuit of FIG. 7 shows a composite switch 70 made up of an array of NMOS transistors which simultaneously perform the above-described exclusive-OR operation and provide a contribution to the weighted sum of the set of masks.

The composite switch 70 comprises a first group of four NMOS transistors T1, T2, T3, and T4. The grids of the transistors T1 to T4 are connected to the output of the memory contained in the block 12 for generating and storing Walsh functions W(n,i); the grids of the transistors T1 and T2 receive the binary value encoding W(n,i), while the grids of the transistors T3 and T4 receive the logical inverse of said value, written $\overline{W(n,i)}$, which can be implemented very simply by placing an inverter at the corresponding output from said memory. The composite switch 70 also has a second group of four NMOS transistors T5, T6, T7, and T8. The grids of transistors T5 to T8 are connected to the output of the memory contained in tha block 14 for generating and storing Walsh functions W(m,j); the grids of transistors T5 and T6 receive the binary value encoding W(m,j) while the grids of transistors T7 and T8 receive the logic inverse of said value, i.e. $\overline{W(m,j)}$, and inversion may be performed in the same manner as described above.

The drains of transistors T5 to T8 are connected to the output of the photodetector element Pij, represented in FIG. 7 as a photodiode, as is the case in one particular embodiment. Thus, the drains of transistors T5 to T8 are fed with the current x(i,j).

The sources of transistors T5, T6, T7, and T8 are connected respectively to the drains of transistors T3, T1, T2, and T4.

The sources of transistors T1 and T3 constitute outputs marked "plus" from the switch 70 where the current x(i,j) has a positive conventional sign, and the sources of transistors T2 and T4 constitute outputs, marked "minus", from the switch 70 where the current x(i,j) has a negative conventional sign.

N×N-composite switches identical to that described above are respectively connected at the N×N crosspoints between the outputs of block 12 and the outputs of block 14. These N×N switches form the weighting and summing module 16 mentioned when describing FIG. 1.

In a particular embodiment, the image sensor comprises a VLSI circuit combining all of the above-described means and implementing the above-mentioned operations in real time.

A particularly advantageous, but non-exclusive application of the present invention lies in mobile radiocommunications for portable devices that must consume as little energy as possible and that must be very compact, e.g. a videophone complying with the GSM (Global System for Mobiles) standard. It would nevertheless also be usable in other fields, and in particular in the fields of optical remote surveillance and of television.

I claim:

1. A method of providing a digital representation of an optical scene, comprising the steps of:
   a) measuring radiometric values of N×N points representing a real two-dimensional optical scene in the form of N×N respective electric signals x(i,j), where N is a positive integer and i and j are integers in the range 0 to N-1, representing said two dimensions;
   b) generating N×N masks respectively associated with the N×N electric signals x(i,j), said masks taking the values +1 or -1 only, and being written Mnm(i,j), where n and m are integers lying in the range 0 to N-1, each mask being a weighting function obtained from:

$$Mnm(i,j) = W(n,i) \times W(m,j)$$

where W(a,b) designates the discrete one-dimensional Walsh function of order a on N points, given by the equation:

$$W(a, b) = \prod_{r=0}^{p(a)-1} f(r, a, b)$$

where $f(r,a,b) = \text{sgn}[\cos(K_{r,a} \cdot 2^r \cdot \pi \cdot (b/N))]$,
where r is an integer,
where b is an integer in the range 0 to N-1, and
where a is an integer such that:

$$a = \sum_{r=0}^{p(a)-1} K_{r,a} \cdot 2^r \text{ with } K_{r,a} \in \{0, 1\},$$

where p(a) is the number of binary digits needed to write the integer a in b ase 2,
where Π is the "product" symbol, and
sgn is the function defined by sgn(x)=+1 if x≧0, and sgn(x)=-1 if x<0;

c) for each couple (n,m), weighting said N×N electric signals x(i,j) directly by the corresponding N×N masks Mnm(i,j) and adding the weighted electric signals to obtain N×N coefficients of a Walsh-Hadamard transform X(n,m), each given by the equation:

$$X(n, m) = \sum_{i=0}^{N-1}\sum_{j=0}^{N-1} x(i, j) \cdot Mnm(i, j),$$

and representing the optical scene.

2. A method according to claim 1, wherein each of the decimal values sgn, f, W and Mmn are encoded as binary variables which are 0 if the respective decimal value is +1 and 1 if the decimal value is -1 and wherein step (b) comprises, for each integer i, 0≦i≦N-1:
   resetting the binary variable encoding W(n,i) to logic level "0";
   initializing r to level 0;
   for each value of r, performing an XOR operation between the current binary variable encoding W(n,i) and the binary variable encoding the decimal magnitude f(r,n, i), updating the binary variable which codes W(n,i) to the logic level obtained after the XOR operation, and incrementing r by 1, until r=p(n);
   and stopping iteration when the integer r reaches the value p(n), whereby the value of the binary variable coding W(n,i) is obtained.

3. A method according to claim 2, further comprising, for obtaining W(m,j), for each integer j, 0≦j≦N-1:
   setting the binary variable encoding W(m,j) to logic level "0";
   setting integer r to 0; and
   for each value of r, performing an XOR operation between the current binary variable encoding W(m,j) and the binary variable encoding the decimal magnitude f(r,m, j) previously obtained, updating the binary variable encoding W(m,j) to the logic level obtained after the XOR operation, and incrementing r by 1; and stopping iteration when the integer r reaches the value p(m), whereby the value of the binary variable coding W(m,j) is obtained.

4. A method according to claim 1, wherein the electrical signals are currents, wherein step (c) comprises, for each couple (n,m), where $0 \leq n \leq N-1$, $0 \leq m \leq N-1$:

distributing the integers i, $0 \leq i \leq N-1$ into two first sets I+ and I−, and the integers j, $0 \leq j \leq N-1$ into two second sets J+ and J−, such that:
$\forall i \in I+, \forall j \in J+, Mnm(i,j)=+1$ and
$\forall i \in I-, \forall j \in J-, Mnm(i,j)=-1$;

adding the currents x(i,j) for which i and j are included respectively in the sets I+ and J+;

adding the currents x(i,j) for which i and j are respectively included in the sets I− and J−, whereby the overall positive component of the current $$C+ = \sum_{i \in I+, j \in J+} x(i,j)$$

and the overall negative component of the current $$C- = \sum_{i \in I-, j \in J-} x(i,j)$$

are obtained, subtracting the current C− from the current C+, thereby providing a coefficient of the Walsh-Hadamard transform X(n,m)=C+−C−.

5. Image sensor comprising:

a matrix arrangement of N×N photodetector means having N rows and N columns, to transform a light signal L(i,j), $0 \leq i \leq N-1$, $0 \leq j \leq N-1$, received from an optical scene in a i-th row and a j-th column into an electric current signal x(i,j);

p(n) first Walsh function generators, numbered by rank r, $0 \leq r \leq p(n)-1$, each comprising:

calculation means receiving the bit $K_{r,n}$ as an input, and calculating the value of f(r,n,i) for all i, $0 \leq i \leq N-1$, and providing an output "0" bit if f(r,n,i)=+1 or an output "1" bit if f(r,n,i)=−1; and N parallel-connected XOR operators, a first input of each of the N operators of rank $r \geq 0$ being connected to the output of said calculation means, and a second input of each of the N operators of rank $r \geq 1$ being connected to the respective corresponding output of the N XOR operators of rank r−1, the second input of each of the N operators of rank r=0 being fed with an initialization "0" logic level;

the N XOR operators of rank r=p(n)−1 delivering as outputs the N bits encoding the N Walsh functions W(n,i) for all i, $0 \leq i \leq N-1$, i.e. of value 0 if W(n,i)=+1, or 1 if W(n,i)=−1;

first memory means, having N inputs respectively connected to the N outputs of the first generator means of rank p(n)−1 for storing the values of W(n,i) for all i, $0 \leq i \leq N-1$;

p(m) second Walsh function generators, numbered by rank r, $0 \leq r \leq p(m)-1$, each comprising:

calculation means receiving the bit $K_{r,m}$ as an input, and calculating the value of f(r,m,j) for all j, $0 \leq j \leq N-1$, and providing an output "0" bit if f(r,m,j)=+1 or an output "1" bit if f(r,m,j)=−1; and N parallel-connected XOR operators, a first input of each of the N operators of rank $r \geq 0$ being connected to the output of said calculation means, and a second input of each of the N operators of rank $r \geq 1$ being connected to the respective corresponding output of the N XOR operators of rank r=0 being fed with an initialization "0" logic level;

the N XOR operators of rank r=p(m)−1 delivering as outputs the N bits encoding the N Walsh functions W(m,j) for all j, $0 \leq j \leq N-1$, i.e. of value 0 if W(m,j)=+1, or 1 if W(m,j)=−1;

second memory means, having N inputs respectively connected to the N outputs of the second generator means of rank p(m)−1 for storing the values of W(m,j) for all j, $0 \leq j \leq N-1$; and N×N solid state elements respectively connnected to one of the N outputs of the first memory means and one of the N outputs of the second memory means, which N×N solid state elements calculate the respective values of the binary variables encoding the N×N Walsh-Hadamard masks Mnm(i,j), giving the corresponding current x(i,j) a positive or a negative conventional sign depending on the logic level of the binary variable encoding Mnm(i,j), summing the currents obtained in this way in application of Kirchhoff's laws to provide N×N output coefficients of the Walsh-Hadamard transform X(n,m), $0 \leq n \leq N-1$, $0 \leq m \leq N-1$ of the optical scene.

6. Image sensor according to claim 5, wherein the photodetector means comprise an array of photodiodes.

7. Image sensor according to claim 5, wherein the photodetector means comprise an array of phototransistors.

8. Image sensor according to claim 5, wherein said N×N solid state elements comprise N×N XOR operators, a first input of each XOR operator being connected to the i-th output of the first memory means and receiving the binary value encoding W(n,i), and a second input of each operator being connected to the j-th output of the second memory means and receiving the binary value encoding W(m,j), each XOR operator delivering as an output a binary value encoding a Walsh-Hadamard mask Mnm(i,j).

9. Image sensor according to claim 5, wherein said N×N solid state elements comprise, for each couple (i,j), $0 \leq i \leq N-1$, $0 \leq j \leq N-1$:

a first group of four NMOS transistors, the grids of two of said transistors of said first group receiving the binary value encoding W(n,i), and the grids of the other two transistors receiving the logical inverse of said binary value encoding W(n,i), and a second group of four NMOS transistors, the grids of two of said transistors of said second group receiving the binary value encoding W(m,j), and the grids of the other two transistors receiving the logical inverse of said binary value encoding W(m,j), the drains of the four transistors of said second group being connected to that output of the photodetector means which is situated in the i-th row and the j-th column so as to receive the current x(i,j), the sources of the four transistors of said second group being connected respectively to the drains of the four transistors of said first group, and the sources of two of the transistors of said first group constituting outputs where the current x(i,j) has a positive conventional sign, and the sources of the other two transistors of said first group constituting outputs where the current x(i,j) has a negative conventional sign.

* * * * *